(12) United States Patent
Berner et al.

(10) Patent No.: US 11,309,549 B2
(45) Date of Patent: Apr. 19, 2022

(54) BIPOLAR PLATE FOR A FUEL CELL AND FUEL CELL

(71) Applicant: Robert Bosch GmbH, Stuttgart (DE)

(72) Inventors: Ulrich Berner, Stuttgart (DE); Jan Hendrik Ohs, Renningen (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 16/468,490

(22) PCT Filed: Nov. 30, 2017

(86) PCT No.: PCT/EP2017/080988
§ 371 (c)(1),
(2) Date: Jun. 11, 2019

(87) PCT Pub. No.: WO2018/108552
PCT Pub. Date: Jun. 21, 2018

(65) Prior Publication Data
US 2019/0334182 A1    Oct. 31, 2019

(30) Foreign Application Priority Data
Dec. 12, 2016 (DE) ...................... 10 2016 224 696.8

(51) Int. Cl.
*H01M 8/0258* (2016.01)
*H01M 8/1004* (2016.01)
(Continued)

(52) U.S. Cl.
CPC ....... *H01M 8/0258* (2013.01); *H01M 8/0232* (2013.01); *H01M 8/0234* (2013.01); *H01M 8/0239* (2013.01); *H01M 8/1004* (2013.01)

(58) Field of Classification Search
CPC ............. H01M 8/0258; H01M 8/0232; H01M 8/0234; H01M 8/0239; H01M 8/1004; H01M 8/0245; Y02E 60/50
See application file for complete search history.

(56) References Cited

U.S. PATENT DOCUMENTS

| 4,855,193 A * | 8/1989 | McElroy | H01M 8/1007 |
| | | | 429/465 |
| 2004/0241078 A1 * | 12/2004 | Inoue | H01M 4/8605 |
| | | | 423/447.1 |

(Continued)

FOREIGN PATENT DOCUMENTS

| DE | 102012221730 | 5/2014 |
| DE | 102014207594 | 10/2015 |

(Continued)

OTHER PUBLICATIONS

International Search Report for Application No. PCT/EP2017/080988 dated Mar. 14, 2018 (English Translation, 2 pages).

*Primary Examiner* — Lisa S Park
(74) *Attorney, Agent, or Firm* — Michael Best & Friedrich LLP

(57) ABSTRACT

The invention relates to a bipolar plate (40) for a fuel cell, comprising a first distributing region (50) for distributing a fuel to a first electrode (21) and a second distributing region (60) for distributing an oxidant to a second electrode (22). At least one woven fabric (80) is provided in at least one of the distributing regions (50, 60). The invention further relates to a fuel cell, comprising at least one membrane electrode assembly (10) having a first electrode (21) and a second electrode (22), which are separated from each other by a membrane (18), and comprising at least one bipolar plate (40) according to the invention.

20 Claims, 3 Drawing Sheets

(51) Int. Cl.
*H01M 8/0232* (2016.01)
*H01M 8/0234* (2016.01)
*H01M 8/0239* (2016.01)

(56) References Cited

U.S. PATENT DOCUMENTS

| | | | | |
|---|---|---|---|---|
| 2005/0123816 A1* | 6/2005 | Gao | ............... | H01M 8/0206 |
| | | | | 429/480 |
| 2008/0268318 A1* | 10/2008 | Jang | ............... | H01M 8/0213 |
| | | | | 429/492 |
| 2014/0147762 A1 | 5/2014 | Maass et al. | | |

FOREIGN PATENT DOCUMENTS

| | | |
|---|---|---|
| EP | 1184925 | 3/2002 |
| JP | 2002015747 A | 1/2002 |
| JP | 2004146226 A | 5/2004 |
| JP | 2005251666 A | 9/2005 |
| JP | 2007128908 A | 5/2007 |
| JP | 2008066270 A | 3/2008 |
| JP | 2008103142 A | 5/2008 |
| JP | 2008176971 A | 7/2008 |
| JP | 2011048936 A | 3/2011 |
| JP | 2015514281 A | 5/2015 |
| JP | 2015115198 A | 6/2015 |
| WO | 0147049 | 6/2001 |
| WO | 03054992 | 7/2003 |

* cited by examiner

BIPOLAR PLATE FOR A FUEL CELL AND FUEL CELL

BACKGROUND OF THE INVENTION

The invention relates to a bipolar plate for a fuel cell comprising a first distributing region for distributing a fuel to a first electrode and a second distributing region for distributing an oxidant to a second electrode. The invention also relates to a fuel cell comprising at least one membrane electrode unit with a first electrode and a second electrode which are separated from one another by a membrane, and at least one bipolar plate.

A fuel cell is a galvanic cell which converts the chemical reaction energy of a continuously supplied fuel and of an oxidant into electrical energy. A fuel cell is thus an electrochemical energy converter. In known fuel cells, in particular hydrogen (H2) and oxygen (O2) are converted into water (H2O), electrical energy and heat.

An electrolyzer is an electrochemical energy converter which decomposes water (H2O) into hydrogen (H2) and oxygen (O2) by means of electrical energy.

Inter alia, proton exchange membrane (PEM) fuel cells are known. Proton exchange membrane fuel cells have a centrally arranged membrane which is permeable to protons, that is, to hydrogen ions. The oxidant, in particular air oxygen, is thus separated spatially from the fuel, in particular hydrogen.

Furthermore, proton exchange membrane fuel cells have an anode and a cathode. The fuel is supplied to the anode of the fuel cell and oxidized catalytically with release of electrons to form protons. The protons pass through the membrane to the cathode. The electrons released are removed from the fuel cell and flow via an external circuit to the cathode.

The oxidant is supplied to the cathode of the fuel cell and it reacts to form water by taking up the electrons from the external circuit and protons which have passed through the membrane to the cathode. The water thus produced is removed from the fuel cell. The overall reaction is:

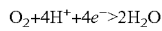

$$O_2 + 4H^+ + 4e^- \rightarrow 2H_2O$$

A voltage is thus applied between the anode and the cathode of the fuel cell. To increase the voltage, several fuel cells may be arranged mechanically one behind another to form a fuel cell stack and connected electrically in series.

Bipolar plates are provided for uniform distribution of the fuel to the anode and for uniform distribution of the oxidant to the cathode. The bipolar plates have, for example, channel-like structures for distributing the fuel and the oxidant to the electrodes. Furthermore, the channel-like structures serve to remove the water produced during the reaction. Furthermore, the bipolar plates may have structures for passing a coolant through the fuel cell to take away heat.

A fuel cell having a generic bipolar plate, which is assembled from two plate halves, is known from DE 10 2012 221 730 A1. Each of the two plate halves here has a distributing region which is provided for distributing the reaction gases.

A bipolar plate for a fuel cell is also known from DE 10 2014 207 594 A1. The bipolar plate here has a meander-like channel which is designed, for example, as a groove. This meander-like channel serves to introduce hydrogen or oxygen into the fuel cell.

SUMMARY OF THE INVENTION

A bipolar plate for a fuel cell is proposed comprising a first distributing region for distributing a fuel to a first electrode and a second distributing region for distributing an oxidant to a second electrode. However, the bipolar plate may also be used in other electrochemical energy converters, for example in an electrolyzer.

According to the invention, at least one woven fabric is provided in the distributing region. Structures for distributing the reaction gases in the distributing region may be designed specifically by suitable arrangement and design of the woven fabric.

The woven fabric is preferably provided in the second distributing region which serves for distributing the oxidant to the second electrode and for removing water produced during the reaction. However, the woven fabric may also be provided, alternatively or additionally, in the first distributing region for distributing a fuel to the first electrode.

A woven fabric within the scope of the present invention is understood to mean a structure which is formed from wires, threads or fibers interwoven with one another. The woven fabric is thus designed to be relatively flat. The woven fabric thus extends in a surface, which defines a woven fabric plane, significantly further than in a direction which is perpendicular to this woven fabric plane.

According to an advantageous design of the invention, the woven fabric is designed to be porous. Hence, the woven fabric is permeable in a direction parallel to said woven fabric plane, just like in the direction perpendicularly to the woven fabric plane, to the oxidant and to the fuel and also to water to be removed.

The woven fabric is preferably designed to be electrically conductive. The woven fabric thus produces an electrically conductive connection to the electrode. Hence, the woven fabric may conduct the electrons released during the electrochemical reaction in the fuel cell.

According to an advantageous design of the invention, the woven fabric has at least one fiber containing metal. The fiber containing metal in particular ensures the electrical conductivity of the woven fabric. For example, titanium, copper, aluminum or stainless steel are suitable as possible materials for the fiber containing metal.

According to a further advantageous design of the invention, the woven fabric has at least one fiber containing carbon. The fiber containing carbon is particularly resistant to corrosion and additionally increases the required mechanical stability of the woven fabric.

According to a further advantageous design of the invention, the woven fabric has at least one fiber containing plastic. The fiber containing plastic is relatively light compared to fibers made of other materials and thus reduces the weight of the woven fabric.

According to one possible design of the invention, the woven fabric has only one type of fibers.

According to a further possible design of the invention, the woven fabric has at least two different types of fibers.

According to an advantageous development of the invention, at least two woven fabrics are stacked one above another in the distributing region. The woven fabrics stacked one above another may thus be assembled and designed in the same way. However, the woven fabrics stacked one above another may also be designed to be different. For example, the woven fabrics stacked one above another may be manufactured from different materials or may have different porosities.

A fuel cell is also proposed comprising at least one membrane electrode unit with a first electrode and a second electrode which are separated from one another by a membrane, and at least one bipolar plate according to the invention. The fuel cell is assembled in particular such that respectively a bipolar plate is connected on both sides of the membrane electrode unit.

Woven fabrics are extremely open-pored, and thus have a high porosity. Due to appropriate variation of the materials used in the production of the woven fabric, the woven fabric may be adapted to the existing conditions and requirements. The structure of the woven fabric can be varied very simply. For example, the woven fabric may be designed such that in flow direction, smaller pores are formed at the start than at the end. Also, woven fabrics, in particular compared to foams, are very simple and cost-effective to produce. When a gas flows through the woven fabric, only a relatively low pressure loss is produced for the gas flow transversely to the woven fabric plane. Since only relatively few contact points of the woven fabric with the cathode adjacent to the woven fabric exist, accumulations of water at the cathode are largely avoided. Different materials with desired specific properties may advantageously be combined. For example, a combination of highly electrically conductive metallic fibers with carbon-containing fibers is conceivable, the latter having better resistance to corrosion. In addition, coatings are conceivable which on the one hand may adjust the corrosion strength, and on the other hand the wetting properties of the woven fabric. The height of the woven fabric, that is, the extension perpendicularly to the woven fabric plane, may be adapted to the height of the distributing region for example by using thicker fibers. A further possibility is the stacking of several thin-wired woven fabrics. Hence, a use of different materials is also facilitated via the height.

BRIEF DESCRIPTION OF THE DRAWINGS

Embodiments of the invention are illustrated in more detail using the drawings and the description below.

In the figures.

DETAILED DESCRIPTION

Figure 1:
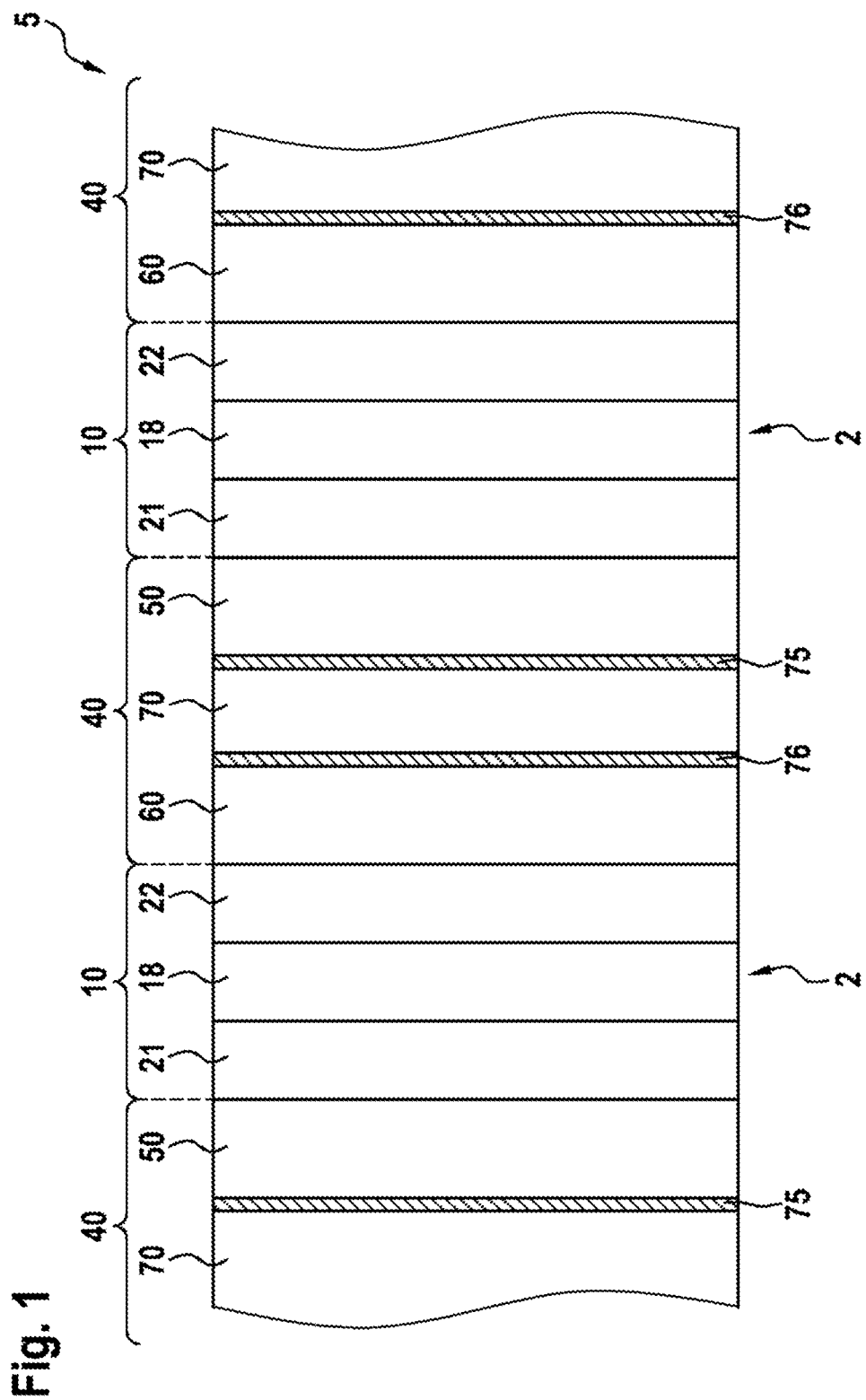
FIG. 1 shows a schematic representation of a fuel cell stack with several fuel cells.

In the following description of the embodiments of the invention, identical or similar elements are designated by the same reference numerals, wherein a repeated description of these elements is dispensed with in individual cases. The figures show the subject matter of the invention only schematically.

FIG. 1 shows a schematic representation of a fuel cell stack 5 with several fuel cells 2. Each fuel cell 2 has a membrane electrode unit 10 comprising a first electrode 21, a second electrode 22 and a membrane 18. The two electrodes 21, 22 are arranged on mutually opposite sides of the membrane 18 and are thus separated from one another by the membrane 18. The first electrode 21 is also designated below as anode 21 and the second electrode 22 is also designated below as cathode 22. The membrane 18 is designed as a polymer electrolyte membrane. The membrane 18 is permeable to hydrogen ions, i.e. $H^+$ ions.

Furthermore, each fuel cell 2 has two bipolar plates 40 which are connected on both sides to the membrane electrode unit 10. In the arrangement shown here of several fuel cells 2 in the fuel cell stack 5, each of the bipolar plates 40 may be viewed as belonging to two fuel cells 2 arranged adjacent to one another.

The bipolar plates 40 comprise respectively a first distributing region 50 for distributing a fuel, which region is facing the anode 21. The bipolar plates 40 comprise respectively also a second distributing region 60 for distributing the oxidant, which region is facing the cathode 22. The second distributing region 60 serves at the same time for removing water produced during a reaction in the fuel cell 2.

Furthermore, the bipolar plates 40 may comprise a third distributing region 70 which is arranged between the first distributing region 50 and the second distributing region 60. The third distributing region 70 serves for passing a coolant through the bipolar plate 40 and hence for cooling the fuel cell 2 and the fuel cell stack 5.

The first distributing region 50 and the third distributing region 70 are separated from one another by a first separating plate 75. The second distributing region 60 and the third distributing region 70 are separated from one another by a second separating plate 76. The separating plates 75, 76 of the bipolar plates 40 are designed here as thin metallic sheets.

During operation of the fuel cell 2, fuel is passed to the anode 21 via the first distributing region 50. Likewise, oxidant is passed to the cathode 22 via the second distributing region 60. The fuel, here hydrogen, is oxidized at the anode 21 catalytically with release of electrons to form protons. The protons pass through the membrane 18 to the cathode 22. The released electrons are removed from the fuel cell 2 and flow via an external circuit to the cathode 22. The oxidant, here air oxygen, reacts to form water by taking up the electrons from the external circuit and protons which have passed through the membrane 18 to the cathode 22.

Figure 2:
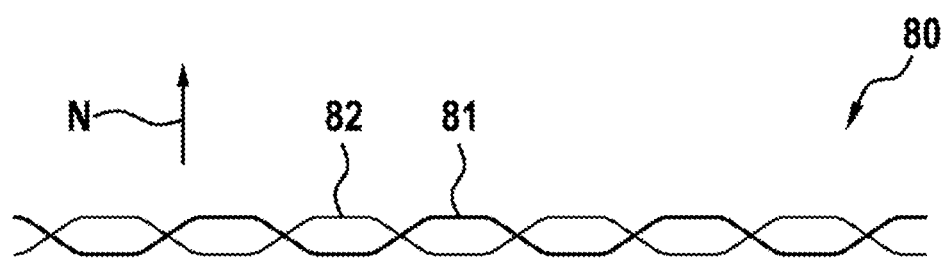
FIG. 2 shows a woven fabric for a distributing region of a bipolar plate according to a first embodiment.

FIG. 2 shows a woven fabric 80 for a distributing region 50, 60 of a bipolar plate 40 according to a first embodiment. The woven fabric 80 according to the first embodiment has several fibers 81 containing metal and fibers 82 containing carbon. In the representation shown, respectively only one of said fibers 81, 82 is shown.

The fibers 81, 82 are interwoven to form a structure designed to be flat. The woven fabric 80 according to the first embodiment extends predominantly in a woven fabric plane which is oriented at right angles to a normal direction N.

Figure 3:
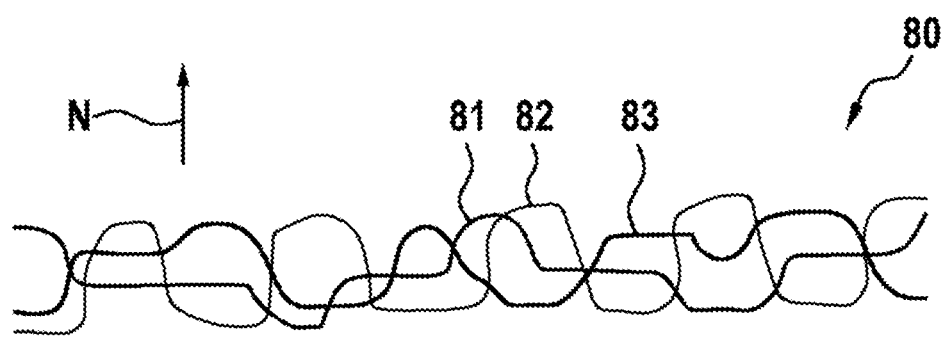
FIG. 3 shows a woven fabric for a distributing region of a bipolar plate according to a second embodiment and FIG. 4 shows an enlarged schematic representation of a bipolar plate of the fuel cell stack from FIG. 1.

FIG. 3 shows a woven fabric 80 for a distributing region 50, 60 of a bipolar plate 40 according to a second embodiment. The woven fabric 80 according to the second embodiment has several fibers 81 containing metal, fibers 82 containing carbon and fibers 83 containing plastic. In the representation shown, respectively only one of said fibers 81, 82, 83 is shown.

The fibers 81, 82, 83 are interwoven to form a structure designed to be flat. The woven fabric 80 according to the second embodiment extends predominantly in a woven fabric plane which is oriented at right angles to a normal direction N. The woven fabric 80 according to the second embodiment extends further in the normal direction N than the woven fabric 80 shown in FIG. 2 according to the first embodiment.

Figure 4:
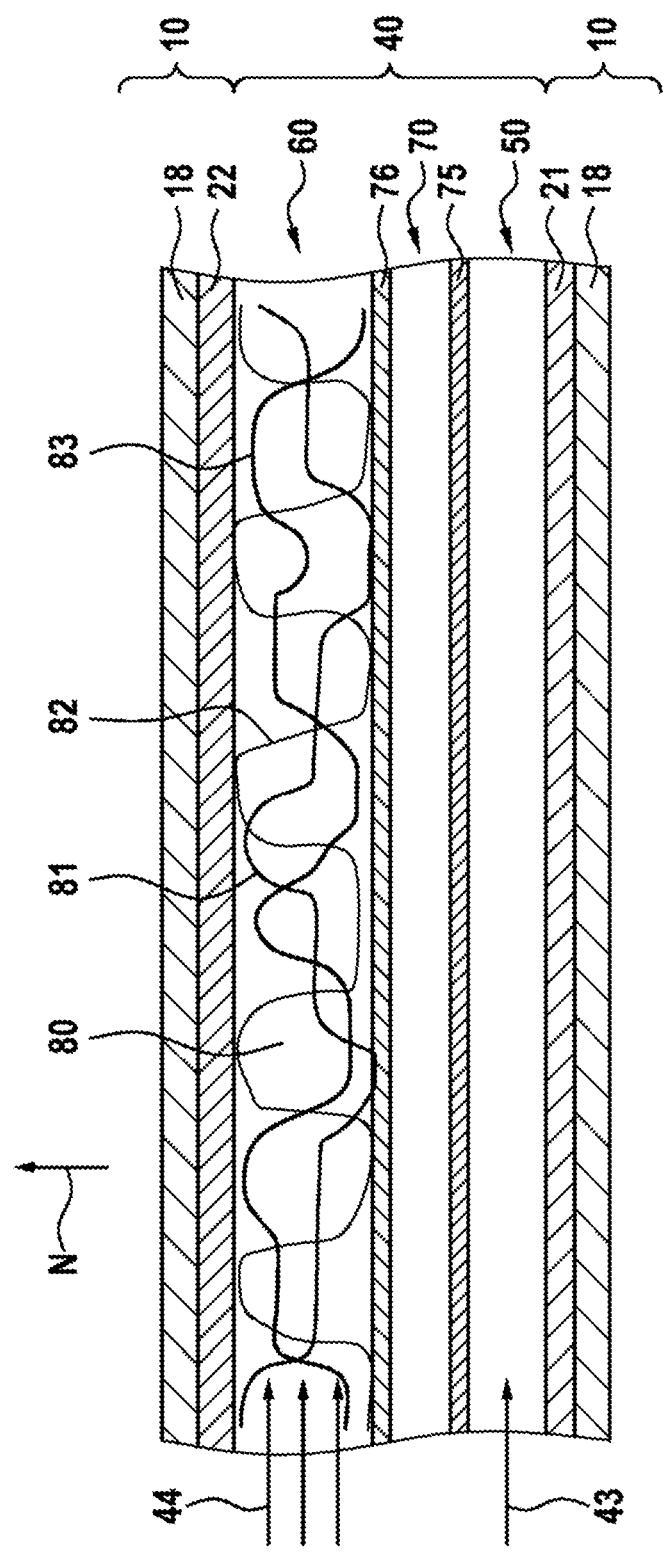

FIG. 4 shows an enlarged schematic representation of a bipolar plate 40 of the fuel cell stack 5 from FIG. 1, which bipolar plate is arranged between two membrane electrode units 10. The separating plates 75, 76 are designed as flat thin metallic sheets and between them form the third distributing region 70 for passing the coolant through. The first distributing region 50 is located between the first separating plate 75 and the anode 21 of the adjacent membrane electrode unit 10. The first distributing region 50 is located between the second separating plate 76 and the cathode 22 of the other adjacent membrane electrode unit 10.

The fuel, here hydrogen, is passed into the first distributing region 50 in a first flow direction 43. The oxidant, here air oxygen, is passed into the second distributing region 60 in a second flow direction 44. Here, the first flow direction 43 and the second flow direction 44 run parallel to one another. It is also conceivable that the first flow direction 43 and the second flow direction 44 run counter or even orthogonally to one another.

A woven fabric 80 according to the second embodiment is arranged in the second distributing region 60 for distributing the oxidant and for removing water produced during a reaction in the fuel cell 2. The woven fabric 80 extends from the second separating plate 76 through the second distributing region 60 as far as the cathode 22 of the adjacent membrane electrode unit 10. The normal direction N of the woven fabric 80 runs at right angles to the first flow direction 43 and to the second flow direction 44.

The woven fabric 80 is porous here and is thus permeable to the oxidant introduced. The woven fabric 80 is also electrically conductive and thus produces an electrically conductive connection between the second separating plate 76 and the cathode 22.

The invention is not restricted to the exemplary embodiments described here and the aspects emphasized therein. Rather, a number of modifications, which lie within the scope of the practice of a person skilled in the art, are possible within the range indicated by the claims.

The invention claimed is:

1. A bipolar plate (40) for a fuel cell (2), the bipolar plate (40) comprising
    a first distributing region (50) for distributing a fuel to a first electrode (21),
    a second distributing region (60) for distributing an oxidant to a second electrode (22), and
    at least one woven fabric (80) in at least one of the distributing regions (50, 60),
    characterized in that the woven fabric (80) has a first fiber (81) containing metal, wherein the woven fabric (80) has a second fiber (82, 83) having a different overall composition from the first fiber (81).

2. The bipolar plate (40) as claimed in claim 1, characterized in that the woven fabric (80) is porous.

3. The bipolar plate (40) as claimed in claim 1, characterized in that the woven fabric (80) is electrically conductive.

4. The bipolar plate (40) as claimed in claim 1, characterized in that the second fiber (82) contains carbon.

5. The bipolar plate (40) as claimed in claim 1, characterized in that the second fiber (83) contains plastic.

6. The bipolar plate (40) as claimed in claim 1, characterized in that at least two woven fabrics (80) are stacked one above another in the at least one of the distributing regions (50, 60).

7. A fuel cell (2) comprising
    at least one membrane electrode unit (10) with a first electrode (21) and a second electrode (22) which are separated from one another by a membrane (18), and
    at least one bipolar plate (40) comprising a first distributing region (50) for distributing a fuel to the first electrode (21), a second distributing region (60) for distributing an oxidant to the second electrode (22), and at least one woven fabric (80) in at least one of the distributing regions (50, 60),
    characterized in that the woven fabric (80) has a first fiber (81) containing metal, wherein the woven fabric (80) has a second fiber (82, 83) having a different overall composition from the first fiber (81).

8. The fuel cell as claimed in claim 7, characterized in that the woven fabric (80) is porous.

9. The fuel cell as claimed in claim 7, characterized in that the woven fabric (80) is electrically conductive.

10. The fuel cell as claimed in claim 7, characterized in that the second fiber (82) contains carbon.

11. The fuel cell as claimed in claim 7, characterized in that the second fiber (83) contains plastic.

12. The fuel cell as claimed in claim 7, characterized in that at least two woven fabrics (80) are stacked one above another in the at least one of the distributing regions (50, 60).

13. The fuel cell as claimed in claim 7, wherein the at least one fiber (81) is a metallic fiber.

14. The bipolar plate (40) as claimed in claim 1, wherein the at least one fiber (81) is a metallic fiber.

15. The bipolar plate (40) as claimed in claim 1, wherein the second fiber (82, 83) contains a second material that is different from metal.

16. The bipolar plate (40) as claimed in claim 1, wherein the second fiber (82, 83) does not contain metal.

17. The bipolar plate (40) as claimed in claim 4, wherein the woven fabric (80) has a third fiber (83) having a different overall composition from the first fiber (81) and the second fiber (82), and wherein the third fiber (83) contains plastic.

18. The fuel cell as claimed in claim 7, wherein the second fiber (82, 83) contains a second material that is different from metal.

19. The fuel cell as claimed in claim 7, wherein the second fiber (82, 83) does not contain metal.

20. The fuel cell as claimed in claim 10, wherein the woven fabric (80) has a third fiber (83) having a different overall composition from the first fiber (81) and the second fiber (82), and wherein the third fiber (83) contains plastic.

* * * * *